United States Patent [19]

Satoh

[11] Patent Number: 5,680,638
[45] Date of Patent: Oct. 21, 1997

[54] MATHEMATICAL EXPRESSION INPUT APPARATUS

[75] Inventor: Akiyoshi Satoh, Nara, Japan

[73] Assignee: Sharp Kabushiki Kaisha, Osaka, Japan

[21] Appl. No.: 500,326

[22] Filed: Jul. 10, 1995

[30] Foreign Application Priority Data

Aug. 5, 1994 [JP] Japan ................... 6-185005

[51] Int. Cl.$^6$ ................... G06F 3/00
[52] U.S. Cl. ................... 395/801; 364/709.12
[58] Field of Search ................... 395/792, 793, 395/801; 364/709.07, 709.08, 709.11, 709.16, 710.12; 345/157, 169

[56] References Cited

U.S. PATENT DOCUMENTS

| | | | |
|---|---|---|---|
| 5,189,633 | 2/1993 | Bonadio | 364/709.12 |
| 5,251,292 | 10/1993 | Martel, Jr. et al. | 395/801 |
| 5,253,191 | 10/1993 | Koumo et al. | 364/709.16 |
| 5,260,886 | 11/1993 | Bunsen | 364/709.07 |
| 5,432,721 | 7/1995 | Satoh | 364/710.08 |
| 5,469,538 | 11/1995 | Razdow | 395/140 |
| 5,526,475 | 6/1996 | Razdow | 395/746 |
| 5,544,262 | 8/1996 | Pagallo | 382/189 |

FOREIGN PATENT DOCUMENTS

| | | |
|---|---|---|
| 2-64851 | 3/1990 | Japan . |
| 4-252351 | 9/1992 | Japan . |
| 4-310170 | 11/1992 | Japan . |
| 4-350170 | 11/1992 | Japan . |

*Primary Examiner*—Heather R. Herndon
*Assistant Examiner*—Stephen Hong
*Attorney, Agent, or Firm*—Nixon & Vanderhye P.C.

[57] ABSTRACT

A mathematical expression input apparatus which is capable of inputting and displaying a mathematical expression efficiently by automatically determining whether or not an element inputted to a displayed input position of a functional expression can be recognized as a complete argument without instructions from the user. In the case of inputting an exponent of a power calculation, it is determined that the input of the argument is complete when a predetermined number of digits such as the second digit is inputted in an exponent display position thereby automatically moving a cursor from the exponent display position to a normal display line position. In addition, for example, in the input of an element in a root symbol where a left bracket is first inputted. It is then determined that the input of the argument is ended with the input of a right bracket which automatically moves the cursor from the inside of the root symbol to the normal display line position adjacent to the root symbol. Thus the cursor is automatically moved in the respective situations to the normal display line position without an additional instruction from the user.

11 Claims, 19 Drawing Sheets

Fig. 2

| INPUT OPERATION | INPUT KEY | DISPLAY SCREEN |
|---|---|---|
| A | 41 52 — [2] [aᵇ] | 82, 83, 81 — "2" |
| B | [A] | 82, 83, 81 — "2 A" |
| C | 41 — [1] | "2 A1" 82, 81 |
| D | 43 53 — [+] [√] | "2 A1 +√□" 86, 84, 85, 81, 82 |
| E | 47 — [(] | "2 A1 +√(□" 86, 84, 85, 81, 82 |
| F | 41 43 41 — [3] [+] [4] | "2 A1 +√( 3 + 4 □" 86, 84, 85, 81, 82 |
| G | 48 — [)] | "2 A1 +√( 3 + 4 )□" 86, 84, 85, 81, 82 |

Fig. 6

| INPUT OPERATION | INPUT KEY | DISPLAY SCREEN |
|---|---|---|
| A | 41  52<br>[2] [aᵇ] | 87  83<br>[2 ▨]···81 |
| B | [A] | 87  83<br>[2 A▨]···81 |
| C | 41<br>[1] | [2 A1 82 □]···81 |

Fig. 8

| INPUT OPERATION | INPUT KEY | DISPLAY SCREEN |
|---|---|---|
| A | 41 51 — [2] [aᵇ] | 82, 83, 81 — "2" |
| B | [A] | 82, 83, 81 — "2 A" |
| C | 41 — [1] | 82, 81 — "2 A1" |
| D | 43 53 — [+] [√] | 86, 84, 85, 82, 81 — "2 A1 +√" |
| E | 47 — [(] | 86, 84, 85, 87, 81 — "2 A1 +√(" |
| F | 41 43 41 — [3] [+] [4] | 86, 84, 85, 87, 81 — "2 A1 +√( 3 + 4" |
| G | 48 — [)] | 86, 84, 85, 82, 81 — "2 A1 +√( 3 + 4 )" |

Fig. 10

| INPUT OPERATION | INPUT KEY | DISPLAY SCREEN |
|---|---|---|
| A | 41 [2]  51 [aᵇ] | 82 83 / 2 /---81 |
| B | [A] | 82 83 / 2 A /---81 |
| C | 41 [1] | A1 82 / 2 /---81 |
| D | 43 [+]  53 [√] | 86 84 85 / 2 A1 +√□ /---81  82 |
| E | 47 [(] | 86 84 85 / 2 A1 +√(▨ /---81  87 |
| F | 41 [3]  43 [+]  41 [4] | 86 84 85 / 2 A1 +√(3+4▨ /---81  87 |
| G | 48 [)] | 86 84 85 / 2 A1 +√(3+4□ /---81  82 |

Fig. 12
(PRIOR ART)

| INPUT OPERATION | INPUT KEY | DISPLAY SCREEN |
|---|---|---|
| H | [ 2 ] | 2☐ |
| I | [ a$^b$ ] | 2☐ (with 13 marker) |
| J | [ 3 ] | 2³☐ (with 13 marker) |
| K | [ + ] | 2³+☐ |

Fig. 13
(PRIOR ART)

| INPUT OPERATION | INPUT KEY | DISPLAY SCREEN |
|---|---|---|
| L | [√ ] | √☐ |
| M | [ 3 ] | √3☐ |
| N | [ π ] | √3π☐ |

| INPUT OPERATION | INPUT KEY | DISPLAY SCREEN |
|---|---|---|
| O | [(] [2] [+] [3] [)] |  |
| P | [a/b] |  |
| Q | [(] |  |
| R | [4] [×] [5] |  |
| S | [)] |  |
| T | [+] |  |

| INPUT OPERATION | INPUT KEY | DISPLAY SCREEN |
|---|---|---|
| H | [ 2 ] |  |
| I | [ $a^b$ ] |  |
| J | [ 3 ] |  |
| U | [ → ] |  |
| K | [ + ] |  |

| INPUT OPERATION | INPUT KEY | DISPLAY SCREEN |
|---|---|---|
| L | [√ ] |  |
| M | [ 3 ] |  |
| V | [ → ] |  |
| N | [ π ] |  |

Fig. 17
(PRIOR ART)

| INPUT OPERATION | INPUT KEY | DISPLAY SCREEN |
|---|---|---|
| O | [(] [2] [+] [3] [)] | (2+3)□ |
| P | [a/b] | 2+3 / □ |
| R | [4] [×] [5] | 2+3 / 4×5□ |
| W | [→] | 2+3 / 4×5 □ |
| T | [+] | 2+3 / 4×5 +□ | ns
MATHEMATICAL EXPRESSION INPUT APPARATUS

BACKGROUND OF THE INVENTION

1. Field of the Invention

The present invention relates to a mathematical expression input apparatus which can be preferably practiced in data input display apparatuses such as desktop electronic calculators and word processors and which facilitates the input of mathematical expressions.

2. Description of the Related Art

In recent years, desktop electronic calculators which have been put on the market are capable of calculating various kinds of functional calculus as well as simple addition, subtraction, multiplication and division. Such calculators can be roughly divided into two types in point of input methods, namely a sequential arithmetic type and a mathematical expression input type. The calculators of the sequential calculation type refer to a calculator in which a display part displays only numeric values when numeric values are inputted in accordance With a mathematical expression to be calculated so that the calculation is performed on the basis of numeric values that have been already inputted and the operational sign every time an operational sign (including equal sign) is inputted, thereby displaying the result of calculations. On the other hand, the calculators of a mathematical expression type refer to a calculator which displays mathematical expressions to be calculated and performs the calculation of the mathematical expressions when the execution of calculation is prompted after the input of the mathematical expressions, thereby displaying the result of calculation.

In calculators capable of inputting and displaying mathematical expressions, the inputted mathematical expressions are displayed on the display part so that the inputted content can be easily confirmed and input mistakes of numeric values are reduced. However, in the input of functional expressions included in mathematical expressions, it sometimes happens that since the input position of elements (hereinafter referred to as arguments) constituting a selected functional expression varies with the kind of the functional expression, such calculation is troublesome for users, thereby impeding an efficient input of functional expressions. In the specification, a functional expression does not mean a general functional expression, but is directed to an expression in which inputting an argument is required, such as a radical expression, power expression, fractional expression and the like.

To efficiently input the arguments of functions, calculators are available in which a set mode is changed at the time of the input depending on the inputted elements on the basis of users' previous assumption of elements to be inputted as arguments.

In these calculators, for example, two modes are set. The first mode refers to a mode in which only numeric values, alphabetic characters representing variables and constants, special signs such as $\pi$, and mathematical expressions enclosed in brackets can be inputted in calculators so that the input of arguments is ended automatically when other elements are inputted. The second mode refers to a mode in which no values are required to be inputted as arguments of functions, and the input of arguments is ended by using specific function keys. Users switch between these two modes to input the arguments.

In the first mode, the apparatus automatically judges that the input of arguments has been ended when the element inputted as an argument of functions is not a single item such as a numeric value and a variable name with the result that a cursor moves to the input position of the following elements. On the other hand, in the second mode, once the mode of inputting arguments is set, the mode remains unchanged until a specific function key is pressed. Therefore, when arguments consist of a plurality of items, the input of argument continues up to the end of calculation.

FIG. 12 shows an input example of a multiplier part of a power calculation in the first mode. In input operation H of FIG. 12, when a numeric value "2" is inputted, the numeric value "2" is displayed on a predetermined display line 11, and at the same time, a cursor position 12 indicative of the input position of the next element is displayed adjacent to the right side of the numeric value "2". In input operation I of FIG. 12, when a $a^b$ key designating a power calculation is inputted, the numeric value "2" constitutes a base of the power calculation and the cursor 12 moves to an exponent display part 13 set above the display line 11 to urge users to input an exponent which is an argument in the power calculation.

In input operation J of FIG. 12, when the numeric value "3" is inputted, the numeric value "3" is displayed in the exponent display part 13. At this stage, the cursor 12 is placed at the right of the numeric value "3" and is held at the input position of argument. In input operation K of FIG. 12, when a plus symbol "+" is inputted, it is judged that the input of arguments has ended, so that the plus symbol "+" is displayed on the normal display line 11, following an element that has been already displayed, and at the same time the cursor 12 is displayed adjacent to the right side of the plus symbol "+".

FIG. 13 shows an example of the inside of a foot symbol in the first mode. In input operation L of FIG. 13, when a root "√" key designating a root calculation is inputted, a root symbol 14 is displayed. The root symbol 14 consists of an upper horizontal linear portion 15 and a lower hook shaped portion 16. The upper horizontal portion 15 of the symbol is displayed in the upper part of the display line 11 while the lower hook shaped portion 16 is displayed in the normal display line 11. The input position of the argument in the root calculation is the display line 11 located below the horizontal linear portion 15. Consequently, even in the input of arguments in the root calculation, the cursor 12 is displayed in the display line 11 in the same manner as that of the normal input. The length of the linear portion in the horizontal linear portion 15 is changed depending on the area in which an element recognized as an argument is displayed so that the cursor is included in the area of the argument until the argument is established.

In input operation M of FIG. 13, when the numeric value "3" is inputted, the numeric value "3" is displayed in the display line 11 which is the input position of the argument and the cursor 12 is displayed adjacent to the right side of the numeric value "3". At this stage, the horizontal linear portion 15 extends over to the upper part of the cursor 12, and the numeric value "3" and the cursor 12 are contained in the root symbol. In input operation N of FIG. 13, when a special symbol "$\pi$" representative of a ratio of the circumference is inputted, it is judged that the input of arguments has been ended, so that the size of the root symbol 14 is determined by setting the length of the horizontal linear portion 15 so that the numeric value "3" may be included in the root signal. The symbol "$\pi$" is displayed in a normal display line 11 and the cursor 12 is displayed adjacent to the right side of the symbol "$\pi$".

FIG. 14 shows an input example of a fractional expression which consists of a plurality of items as an input example of a fraction in the first mode. In input operation O of FIG. 14, when a mathematical expression "(2+3)" enclosed in brackets is inputted, the mathematical expression "(2+3)" is displayed in the normal display line 11 while at the same time displaying the cursor 12 adjacent to the right side of the mathematical expression "(2+3)". In input operation P of FIG. 14, when the "a/b" key is inputted which designates a fractional calculation, the mathematical expression "2+3" becomes a numerator of the fraction and moves to a numerator display part 17 located above the display line 11. Then the bracket is erased which has been used to identify the mathematical expression "2+3" as a numerator. The cursor 12 moves to a denominator display part 18 located under the display line 11 to urge users to input the denominator, which is an argument of the fractional expression.

A horizontal line 19 is displayed between the numerator display part 17 and the denominator display part 18 to allow users to recognize that the fractional expression is being inputted and to clearly distinguish between the numerator and the denominator. The length of the horizontal line 19 is changed depending on the length of the area where elements to be inputted as the numerator or the denominator are displayed.

In input operation Q of FIG. 14, when the left side bracket "(" is inputted, the left side bracket "(" is displayed in the denominator display part 18 on the display screen while the cursor 12 is displayed adjacent to the right side of the left bracket "(". Since the left side bracket "(" is located at the head of the denominator display part 18 which is the input position of the argument, in input operation R of FIG. 14, the inputted mathematical expression "4×5" is recognized as the denominator as it is, and is displayed in the denominator display part 18 of the display screen. Then the cursor 12 is displayed adjacent to the right side of the numeric value "5". Since the denominator display part 18 contains the cursor 12, the length of the area of the denominator display part 18 becomes longer than that of the area of the numerator display part 17. Consequently, the element displayed in the numerator display part 17 is shifted to a position where the element displayed in the numerator display part 17 is balanced with that in the denominator display part 18.

In input operation S of FIG. 14, when the right bracket ")" is inputted, the denominator display part 18 displays "(4+5)". Further, the cursor 12 is displayed adjacent to the right side of the right side bracket ")". In input operation T of FIG. 14, when the plus symbol "+" is inputted, it is judged that the input of the argument is ended so that the plus symbol "+" is displayed in the normal display line 11 following the already displayed element (fractional expression) while the cursor 12 is displayed adjacent to the right side of the plus symbol "+". Additionally, the bracket used for inputting the mathematical expression "4×5" as a denominator is not erased and remains on the display screen after the end of the fractional expression input.

In the first mode, except for the case of using the bracket symbol, since the argument of functions is limited only to single items such as numeric values and variables, the input of arguments is automatically ended at the time of the input of elements which do not satisfy conditions. Since the inputted elements are displayed in the normal display line 11, the end of the argument input is not required to be designated and no needless trouble is caused. Further, in the case of inputting a mathematical expression comprising a plurality of items, bracket symbols are used so that users can easily recognize them.

FIGS. 15 through 17 show an input example in the second mode. There is described a case in which a mathematical expression identical to the mathematical expressions shown in FIGS. 12 through 14.

FIG. 15 shows an input example of the multiplier part of a power calculation like FIG. 12. Constituent elements in FIG. 15 identical to those in FIG. 12 are designated by the same reference numerals as those in FIG. 12. Input operations H, I, J, and K of FIG. 15 are the same as input operations H, I, J, and K of FIG. 12, respectively, and the displayed results corresponding to the respective operations H, I, J and K of FIG. 15 are also the same as those of FIG. 12.

In input operation U of FIG. 15 following input operation J of FIG. 15, since the end of the argument input is designated by the input of a cursor moving key "→", the cursor 12 is displayed following an element (power) already displayed in the normal line I1. In input operation K of FIG. 15, when the plus symbol "+" is inputted, the plus symbol "+" is displayed following the already displayed element (power). At the same time, the cursor 12 is displayed adjacent to the right side of the plus symbol "+".

FIG. 16 shows an input example of the inside of the root symbol like FIG. 13. Constituent elements in FIG. 15 identical to those in FIG. 13 are designated by the same reference numerals as those in FIG. 13. Input operations L, M and N of FIG. 16 are the same as the input operations L, M and N of FIG. 13, respectively, and the displayed results corresponding to the input operations L, M, and N of FIG. 16 are also the same as those of FIG. 13.

In input operation V of FIG. 16 following input operation M of FIG. 16, since the end of the argument input is designated by the input of the cursor moving key "→", the horizontal linear portion 15 has a length sufficient to include the numeric value "3" in the root symbol 14 thereby determining the size of the root symbol 14. Since the elements that constitute the argument in the foot symbol are determined, the cursor 12 is displayed following the root symbol 14. In input operation N of FIG. 16, the inputted symbol "π" is displayed following the already displayed element (root symbol), and the cursor 12 is displayed adjacent to the right side of the symbol "π".

FIG. 17 shows an input example of a fractional expression comprising a plurality of items as an input example of a fraction like FIG. 14. Constituent elements in FIG. 17 identical to those in FIG. 14 are designated by the same reference numerals as those in FIG. 14. Input operations O, P, R, and T of FIG. 17 are the same as input operations O, P, R, and T of FIG. 14, respectively, and the displayed results corresponding to the respective operations O, P, R and T of FIG. 15 are also the same as those of FIG. 12.

In input operation P of FIG. 17, at the stage of the input of the "a/b" key designating a fractional calculation, a horizontal line 19 is displayed in the center of the display line 11. The mathematical expression "2+3" is displayed in the numerator display part 17 above the horizontal line 19. Then, the cursor 12 is displayed in the denominator display part 18 below the horizontal line 19.

In the first mode, an expression consisting of a plurality of items cannot be inputted as an argument without using bracket symbols. In the second mode, the expression can be inputted without using the bracket symbols. In other words, in input operation R of FIG. 17, the mathematical expression "4×5" is recognized as an argument of the fractional expression. Then the mathematical expression "4×5" is displayed in the denominator display part 18. At this point, the cursor 12 is displayed adjacent to the right side of the numeric value "5" displayed in the denominator display part 18. The horizontal line 19 is displayed extending up to the above of the cursor 12. In input operation W of FIG. 17, the end of the argument input is designated by the input of the cursor moving key "→", the cursor 12 moves from the denominator display part 18 to the normal display line 11. Since the input of the argument is ended, the horizontal line 19 is defined to a length that depends on the number of elements inputted either as the numerator or as the denominator. The cursor 12 is displayed adjacent to the right of the horizontal line 19.

After that, in input operation T of FIG. 17, the inputted plus symbol "+" is displayed following the already displayed element(fractional expression) and the cursor 12 is displayed adjacent to the right of the plus symbol "+".

In the second mode, the cursor moving key must be operated when the input of arguments is ended irrespective of the kind and the number of elements to be inputted as arguments. This causes an inconvenience. However, in the input example shown in FIG. 17, no needless brackets remain in the denominator display part 18 unlike the input case of the first mode shown in FIG. 14. Since unnecessary data is not registered in the memory, the waste of the memory can be avoided.

Japanese Unexamined Patent Publication JPA 2-64851 (1990), Japanese Unexamined Patent Publication JPA 4-252351 (1992) and Japanese Unexamined Patent Publication JPA 4-310170 (1992) describe processors that can input and display mathematical expressions.

In a word processor disclosed in Japanese Unexamined Patent Publication JPA 2-64851, when a mathematical expression is inputted, the mathematical expression is selected from a menu screen previously prepared for the selection of mathematical expressions. In the case where the selected mathematical expression requires an argument, a cursor is moved to a previously determined input position. After the input of elements as an argument is ended, a cursor moving key is used to designate the end of the argument input. At this time, users have to input a plurality of items as arguments in some selected mathematical expressions. In such a case, users press the cursor moving key every time they end the input of the argument in each item. As a consequence, the cursor sequentially moves the input positions of argument consisting of a plurality of items in a predetermined order. When the cursor moving key is pressed after the input of all the arguments items of a plurality of items is ended, the cursor moves from the input position of arguments to the normal input position.

In a calculator disclosed in the Japanese Unexamined Patent Publication JPA 4-252351 (1992), the argument input mode is set by pressing a specific mathematical symbol key with the result that the cursor is moved to the input position of the argument. When the input of the argument is ended, the input end is designated by using the cursor moving key. At this time, when the argument to be inputted consists of a plurality of items, the cursor moves to the next input position of the argument. When the input of all the arguments of a plurality of items is ended, users designate that the input of the argument is ended by moving the cursor moving key. With this operation, the cursor moves from the input position of the argument to the normal input position.

In an apparatus disclosed in Japanese Unexamined Patent Publication JPA 4-310170 (1992), when a mathematical expression is to be inputted, the mathematical expression is selected from a menu screen which is preliminarily prepared for the selection of mathematical expressions as seen in the word processor disclosed in Japanese Unexamined Patent Publication JPA 2-648518 (1992). When the input of the argument is ended, a specific control code that has been preliminarily defined is inputted to designate that the input of the argument is ended. At this time, a plurality of items must be inputted as an argument in some selected mathematical expression. Users press the cursor moving key every time the input of each item in the argument is ended. As a consequence, the cursor sequentially moves the argument input position in accordance with a predetermined order. When the cursor moving key is pressed after the input of all the plurality of items in the argument is ended, the cursor moves from the input position of argument to the normal input position.

In the calculator providing only the first mode according to the prior art that has been described above, since judgment is made as to whether inputted elements can be recognized as an argument or not at the stage where the input of these elements is ended, the cursor remains at the input position and is not moved, for example, even by the input of the right bracket which closes a space opened by the left bracket at the head of the argument. However, users believe that they have ended the input of the argument by inputting the right bracket, but the cursor does not move to the normal input position. Thus there arises a problem that it is difficult to know whether an element to be inputted in the next operation can be recognized as an argument, or the element can be recognized as a normal input.

In the calculator providing only the second mode according to the prior art described above, the input of the argument causes much trouble because a key for designating the end of the argument input, for example, a cursor moving key must be used to designate the end of the argument input for ending the argument input irrespective of the kind and number of elements to be inputted as arguments. The apparatuses described in the above-mentioned patent applications are so constituted that the input of the argument is ended by a predetermined operation such as pressing of the cursor moving key, and the input of the control command, like the second mode apparatuses.

To solve the above-mentioned problem, a calculator is available which switches over the first mode and the second mode that have been described in the prior art. With this calculator, users can select the optimal input mode depending on the elements to be inputted as an argument so that the operability of calculators can be improved at the time of the input of the argument. However, such calculator also causes trouble because users must operate a switch for switching over the modes depending on the elements to be inputted as the argument.

SUMMARY OF THE INVENTION

An object of the present invention is to provide an apparatus for inputting a mathematical expression, which is capable of efficiently inputting a mathematical expression without causing a trouble to users by automatically judging whether an element of the inputted expression can be recognized as a so-called argument.

The invention provides a mathematical expression input apparatus comprising:
 display means for displaying mathematical expressions;
 input means for inputting mathematical expressions and elements constituting mathematicaly expression arguments;
 selection means for selecting one of a plurality of mathematical functional expressions requiring a subsequent entry of one or more elements constituting an argument for the selected function expression; and display control means for displaying an inputted element along a predetermined display line on the display means, the display control means further displaying a cursor having a predetermined shape, the position of the cursor indicating a subsequent input position above, on or below the predetermined line of the display means; wherein the display control means automatically positions the cursor at an input position of a predetermined element corresponding to the selected functional expression above, below or on the predetermined display line; and repositions the cursor to a next sequential input position on the predetermined display line when it is determined on the basis of the inputted elements alone that the complete argument of the functional expression has been input.

Further, the invention is characterized in that the display control means judges that the input of the functional expression has been ended at the time of the input of an element other than numbers when a number is first inputted as an element included in a selected functional expression.

Still further, the invention is characterized in that the display control means judges that the input of the functional expression has been ended at the time of the input of elements having a predetermined number of digits when a character representative of a variable is first inputted as an element which constitutes a selected functional expression.

Still further, the invention is characterized in that, when a left bracket has been first inputted as an element which constitutes a selected functional expression, the display control means judges the input of the functional expression has been ended at the time of the input of a right bracket which constitutes a pair of brackets with the left bracket and the control erases the pair of brackets at the time of the input of the bracket.

Further, the invention is characterized in that the display control means displays the cursor in a shape different from the predetermined shape when the cursor is displayed in a predetermined input position for a selected functional expression to indicate that an argument for the selected functional expression is required to be input by the user.

Further, the invention is characterized in that, when the left bracket is inputted as an element included in a selected functional expression, the display control means displays the cursor in a shape different from the predetermined shape.

Further, the invention is characterized in that, in the case where the left bracket has been inputted as an element included in a denominator of a fractional functional expression, the display control means erases the pair of brackets consisting of the left and right brackets at the time of the input of the right bracket.

Further, the invention is characterized in that, when the left bracket which is inputted as an element included a functional expression has been erased, the display control means displays a next succeeding element shifted to the position occupied by the left bracket prior to erasure.

According to the invention, in the mathematical expression input apparatus, an element inputted by using the input means is displayed at the cursor position displayed in the display line predetermined in the display means, and the cursor moves to the next position on the right side thereof. When a functional expression is selected with the selection means provided in the mathematical expression input apparatus, the cursor is moved to the predetermined element input position corresponding to the functional expression selected, thereby reminding users of the fact that the functional expression is being inputted. When it is judged on the basis of the inputted elements that the input of the functional expression has been ended, the cursor is brought back to the predetermined display line and is displayed there.

Consequently, when users select a functional expression, the cursor is moved from the predetermined display line to the element input position predetermined for each of functional expressions. Further, when the display control means judges on the basis of the inputted elements that the input of the functional expression has been ended, the cursor is brought back to the display line.

Further preferably, the display control means judges that the input of the functional expression has been ended by the input of an element other than numeric values when a numeric value is first inputted as an element constituting the selected functional expression. Consequently, when the numeric value is first inputted as an element constituting the selected functional expression, the display control means automatically judges by the input of an element other than numeric values that the input of the functional expression has been ended to bring back the cursor to the predetermined display line.

Further preferably, when a letter representative of a variable is first inputted as an element constituting the selected functional expression, the display control means judges that the input of the functional expression has been ended at the time of the input of an element with a predetermined number of digits. Consequently, when a letter representative of a variable is first inputted by users at the time of the input of elements constituting the functional expression, it is judged that the input of the functional expression has been ended at the time of the input of the element surpassing the predetermined number of digits after inputting letters up to the predetermined number of digits thereby bringing back the cursor to the predetermined display line.

Further, preferably, when the left bracket is first inputted as an element constituting the selected functional expression, the display control means judges that the input of the functional expression has been ended at the time of the input of the right bracket which pairs with the left bracket. Consequently, when users input the left bracket at the head of the constituent elements of the functional expression, all the input is recognized as constituent elements of the functional expression until the right bracket pairing with the left bracket is inputted. Thus, various forms of mathematical expressions can be inputted.

Further preferably, when the cursor is displayed in the element input position predetermined for each functional expression, the display control means displays the cursor in a shape different from the predetermined shape. Consequently, users can recognize that the element of the functional expression is being inputted from the fact that the shape of the cursor is changed.

Further preferably, when the left bracket is first inputted as an element constituting the selected functional expression, the display control means displays the cursor in a shape different from the predetermined shape. Consequently, users can recognize that the head of the element of the functional expression currently input is the left bracket from the fact that the shape of the cursor is changed.

Further preferably, the display control means erases the pair of brackets on both ends by the input of the right bracket when the left bracket is first inputted as an element constituting the selected functional expression. Consequently, brackets are erased which are meaningless as constituent elements of the functional expression.

Further preferably, when the left bracket is erased which is inputted as an element constituting the functional expression, the display control means displays the elements more closely by the space of the erased left bracket. Consequently, the elements following the erased left bracket are displayed more closely by the space of the erased left bracket.

As described above, according to the invention, when users select the functional expression, the cursor moves to the element input position predetermined for each functional expression. Thus it is easy to recognize where an element to be inputted is displayed. In addition, when the display control means judges on the basis of the input element that the input of the functional expression has been ended, the cursor is automatically brought back to the predetermined display line without an instruction from users. Thus this can save the users troubles.

Further, according to the invention, when the head element constituting the functional expression is a numeric value, it is judged that the input of the functional expression has been ended with the input of an element other than the numeric value. When the head element is a letter representative of a variable, it is judged that the input of the functional expression has been ended by the input of elements up to the predetermined number of digits. When the head element is the left bracket, it is judged that the input of the functional expression is ended with the input of the right bracket which pairs with the left bracket. Therefore, the cursor is automatically brought back to the display line depending on the situations without instructions from users.

Further, according to the invention, when the cursor is displayed in the element input position predetermined for each functional expression, the cursor is displayed in a shape different from the predetermined shape. Thus, it is easy for users to recognize that the element of the functional expression is being currently inputted.

Further, according to the invention, when the left bracket is inputted at the head of the element constituting the functional expression, the displayed cursor is displayed in a shape different from the predetermined shape. Thus users can recognize that the element of the functional expression is being currently inputted, and the element at the head of the functional expression is the left bracket.

Further, according to the invention, when the left bracket exists at the head of the element constituting the functional expression and the right bracket is inputted which pairs with the left bracket, the pair of brackets will be erased so that no redundant brackets will be displayed.

Further, according to the invention, the erased bracket is filled with other elements so that no display space will be wasted.

BRIEF DESCRIPTION OF THE DRAWINGS

Other and further objects, features, and advantages of the invention will be more explicit from the following detailed description taken with reference to the drawings wherein:

FIG. 2 is a view showing an input example of a mathematical expression according to the first embodiment of the invention;

FIG. 6 is a view showing an input example of a mathematical expression according to a second embodiment of the invention;

FIG. 8 is a view showing an input example of a mathematical expression according to a third embodiment of the invention;

FIG. 10 shows an input example of a mathematical expression according to a fourth embodiment of the invention;

FIG. 12 is a view showing an input example of a power calculation in the conventional calculator;

FIG. 13 is a view showing an input example of root symbol calculation expression in a conventional calculator;

FIG. 17 is a view showing an input example of a fractional calculation expression in another conventional calculator.

DESCRIPTION OF THE PREFERRED EMBODIMENTS

Figure 1:
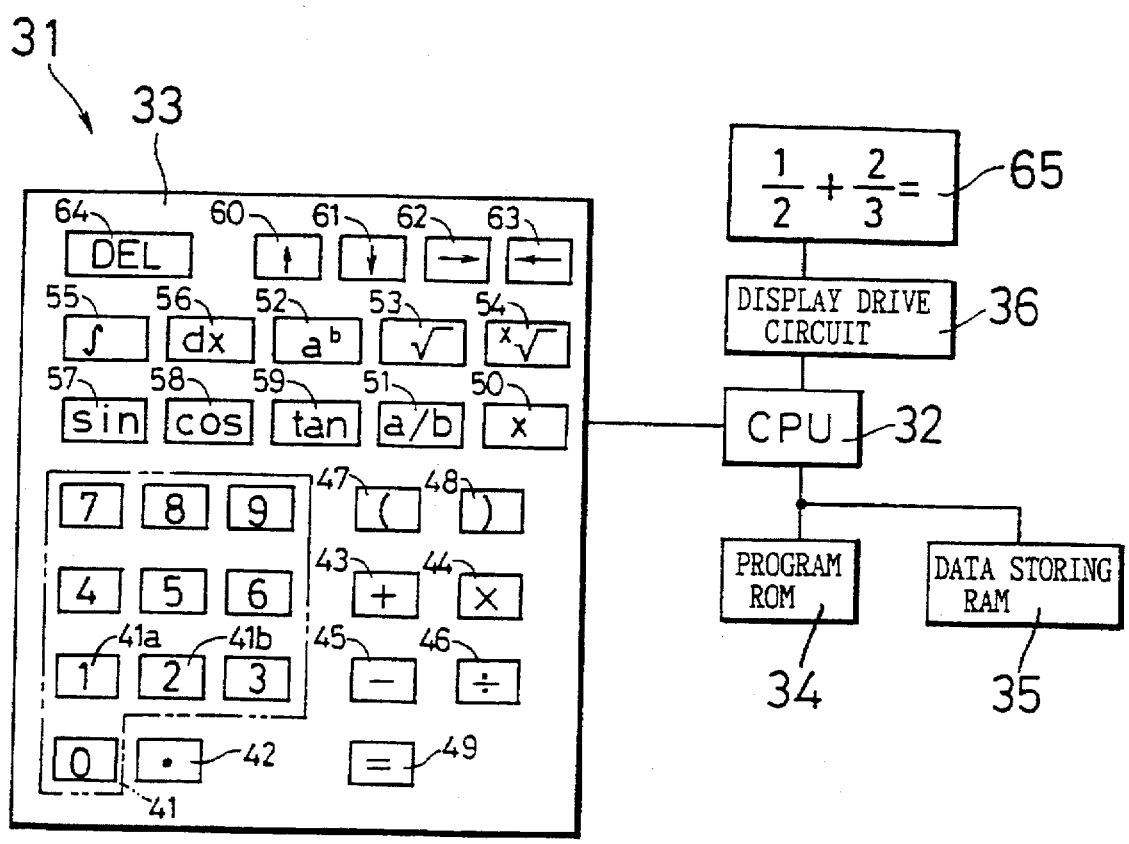
FIG. 1 is a block diagram showing a calculator 31 according to a first embodiment of the invention.

Now referring to the drawings, preferred embodiments of the invention are described below.

FIG. 1 is a block diagram showing a basic structure of a calculator 31 according to a first embodiment of the invention. The calculator 31 is provided with a central processing unit (CPU) 32 for controlling an operation of the whole apparatus. The CPU 32 is connected to a keyboard 33, a program read only memory (ROM) 34, a data storing random access memory (RAM) 35 and a display driving circuit 36 via a bus line to supply a control signal to respective parts.

The keyboard 33 provides a plurality of keys. The numeric value keys 41 and a decimal point key 42 are primarily used for inputting numeric values. An addition symbol key 43, a multiplication symbol key 44, a subtraction symbol key 45 and a division symbol key 46 are used for specifying a calculation to be performed. A left bracket key 47 and a right bracket key 48 are used for embracing a mathematical expression or the like with brackets. An equality key 49 is used to obtain a calculation result. A variable input key 50 is used for designating a variable X. A fractional calculation key 51, a power calculation key 52, a root symbol calculation key 53 and a X power root symbol calculation key 54 are used for the selection of functions. A sine key 57, a cosine key 58 and a tangent key 59 are used for inputting a trigonometric functions. An upward cursor moving key 60, a downward cursor moving key 61, a rightward cursor moving key 62 and a leftward cursor moving key 63 are used for moving a cursor indicative of an input position. A delete key 64 is used for correcting an input error. Further, letters such as "A" or the like used for representing the name of a variable and a special symbols such as "π" or the like are inputted by pressing the specific cursor moving key and a numeric value key at the same time.

The program ROM 34 stores a method or the like for treating a mathematical expression while the data storing RAM 35 stores mathematical expression data at the time of executing a program. The display driving circuit 38 is connected to a display device 65 to control the display device 65.

Assuming that the calculator 31 constituted as described above is used, the following explanation will be given. When a functional expression selection key is inputted, users are required to input one or more predetermined elements in response to the kind of the functional expression selected. The elements are generally referred to as an "argument". The "argument" is inputted at a predetermined position for each functional expression. In the specification, a functional expression does not mean a general functional expression, but means an expression in which inputting an argument is required, such as a radical expression, power expression, fractional expression and the like.

FIG. 2 is a view explaining an input example of a mathematical expression in the calculator 31. In this embodiment, the number of letters constituting the name of a used variable is up to N letters. A numerical subscript may be added after alphabetic letters to constitute a variable. The use of special symbols such as "π" and "θ" are limited to the following manner; they are either used alone, or are added with numerical subscripts. Additionally, when a numeric value and a special symbol are successively inputted by omitting the multiplication symbol "×" as can be seen in "2π", they are treated as plural items. Moreover, in the embodiment shown in FIG. 2, the number of letters of the name of a variable and the name of a constant are limited to two letters.

In input operation A of FIG. 2, when the numeric value "2" key 41b included in the numeric value keys 41 is inputted, the numeric value "2" is displayed on a predetermined display line 81 on the display screen. Consequently, when the power calculation key 52 for designating a power calculation is inputted, the numeric value "2" constitutes a base with the result that a cursor 82 is moved to an exponent display part 83 set above the display line 81 to urge users to input an exponent which is an argument in the power calculation.

In input operation B of FIG. 2, when the alphabetic letter "A" is inputted the exponent display part 83 displays the alphabetic letter "A". The cursor 82 is located at the right side of the alphabetic letter "A". In input operation C of FIG. 2, when the numeric value "1" is inputted which is included in the numeric value key 41, the numeric value "1" is displayed. At this moment it is determined that the input of the argument is ended, and the cursor 82 is then displayed at a position following an element (power) already displayed in the normal display but line 81.

In input operation D of FIG. 2, when the addition symbol key 43 is inputted, the addition symbol "+" is displayed on the display screen and the cursor 82 is displayed adjacent to the right side of the addition symbol "+". Following that, when the root symbol calculation key 53 designating the root symbol calculation is inputted, a root symbol 84 is displayed adjacent to the right side of the addition symbol "+" so that the cursor 82 is displayed inside of the root symbol 84. The root symbol 84 consists of an upper horizontal linear portion 85 and a lower crooked portion 86. The upper horizontal linear portion 85 is displayed above the normal display line while the lower hooked portion 86 is displayed on the display line 81.

Since the argument input position of the root symbol calculation is the display line 81 located below the upper horizontal linear portion 85, the cursor 82 is displayed on the display line 81 in the input of the argument of the root symbol calculation just like in the case of normal input. The upper horizontal linear portion 85 is changed in length depending on an area where an element recognized as an argument is displayed. The upper horizontal linear portion 85 is displayed in such a length as to include the cursor 82 in an area of the argument until the input of the argument is ended. Users can recognize from the position of the cursor 82 with respect to the horizontal linear portion 85 whether the argument is being inputted.

In input operation E of FIG. 2, when the left bracket 47 is inputted, the left bracket "(" is displayed at the input position of the argument of the root symbol calculation. At the same time, the cursor 82 is displayed next to the left bracket "(" on the right side. In input operation F of FIG. 2, since the left bracket is located at the head of the input position of the argument, the input mathematical expression "3+4" is recognized as an argument as it is and is displayed in the display line 81. The cursor 82 is displayed next to the numeric value "4" on the right side, and the upper horizontal linear portion 88 indicative of the area in the root symbol extends over and above of the cursor 82.

In input operation G of FIG. 2, when the right bracket key 48 is inputted, the right bracket ")" is displayed at the input position of the argument. In addition, since it is judged that the input of the argument has been ended, the upper horizontal linear portion 85 has a length sufficient to include a portion up to the right bracket in the root symbol. The cursor 82 is displayed at a position following the root symbol 84 which contains therein the argument already displayed of the display line 81.

Figure 3:
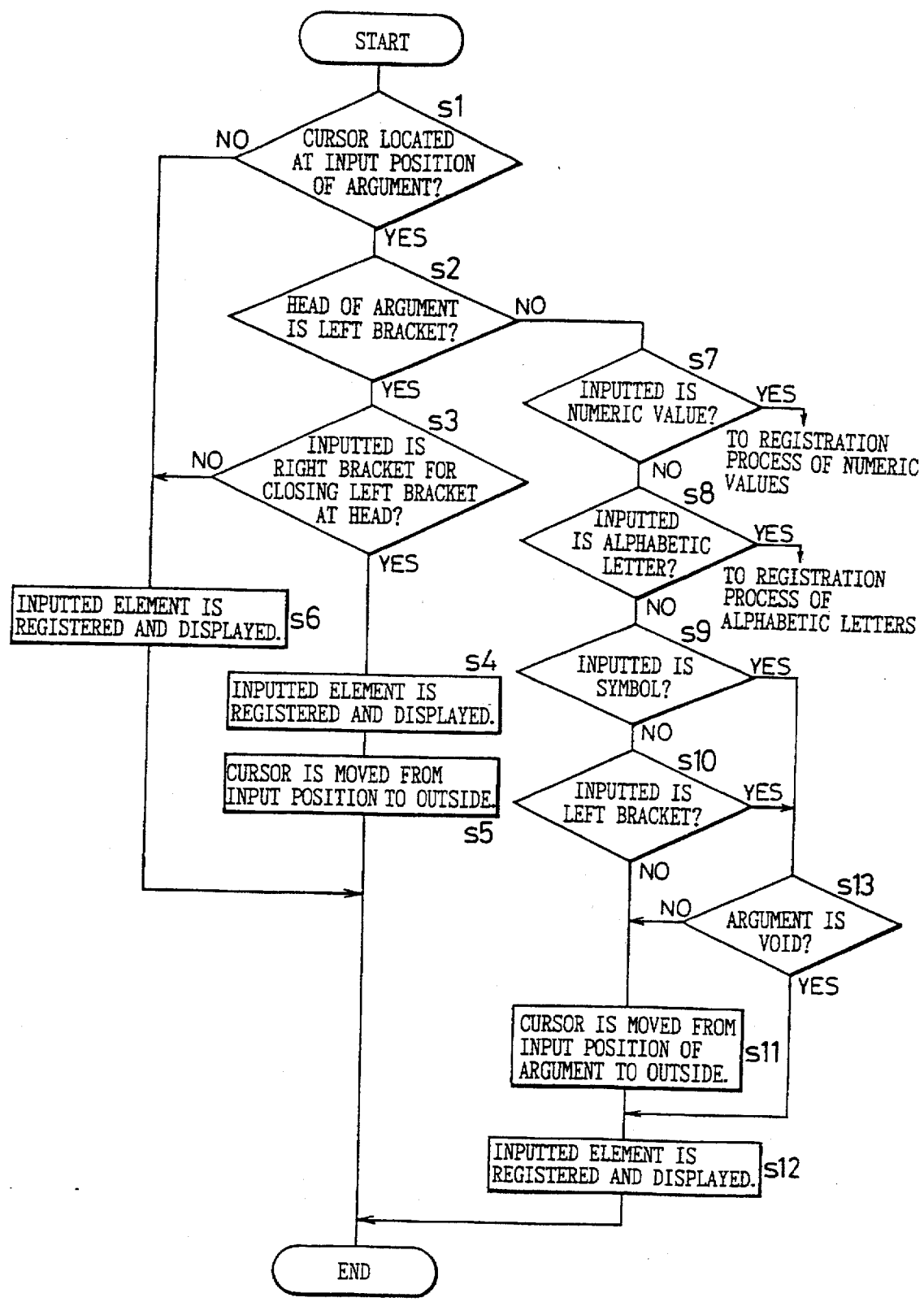
FIG. 3 is a flowchart for explaining mathematical expression input processing according to the first embodiment of the invention.

FIG. 3 is a flowchart explaining mathematical expression input processing in the calculator 31. At step s1, it is judged whether the cursor 82 is located at an input position of the argument. When the position of the cursor 82 is the input position of the argument, the process proceeds to step s2 to judge whether the head of the argument is the left bracket. When the head of the argument is the left bracket, the process proceeds to step s3 to judge whether the input element is the right bracket which closes the left bracket. When the head left bracket is closed with the input right bracket, the process proceeds to step s4 to register the input element in the data storing RAM 35 and displays the element on the display device 65. Further, the process proceeds to step s5 where it is judged that the input of the argument has been ended to move the cursor 82 from the input position of the argument to the normal display line. The processings of steps s3-s5 correspond to input operation G of FIG. 2.

When it is judged at step s3 that the input element is not the right bracket which closes the head left bracket. 2F), the process proceeds to step s6 where the input element is registered in the data storing RAM 35 and is displayed on the display device 65. The processings of steps s3, s6 correspond to input operation F of FIG. F.

When it is judged at step s1 that the cursor is not located at the input position of the argument, the process proceeds to step s6 where the input element is reflected in the data storing RAM 35 and is displayed on the display device 65. The processings of steps s1, s6 correspond to input operation D of FIG. 2.

When it is judged at step s2 that the head of the argument is not the left bracket, the process proceeds to step s7 to judge whether the input element is a numeric value. When the input number is a numeric value, the process proceeds to a flowchart for explaining the numeric value registration process the shown in FIG. 4. The processings of steps s2, s7 and of FIG. 4 correspond to input operation C the processing of FIG. 2C. Further, when the input element is not a numeric value, the process proceeds to step s8 to judge whether the input element is an alphabetic letter. When the input element is an alphabetic letter, the process proceeds to a flowchart for explaining alphabetic letter registration processing shown in FIG. 5. The processings of steps s2, s8 and of FIG. 5 correspond to input operation B of FIG. 2. When the input element is neither a numeric value nor an alphabetic letter, the process proceeds to step s9 to judge whether the input element is a symbol such as "π" and "θ". As symbols, Greek letters are generally used.

When the inputted element is not a symbol, the process proceeds to step s10 to judge whether the inputted element is the left bracket or not. When the inputted element is not the left bracket, the process proceeds to step s11 to move the cursor 82 from the input position of the argument to the normal display line 81. Further, the process proceeds to step s12 to register the input element in the data storing RAM 35 and display the element on the display device 65.

When the inputted element is judged to be a symbol, the process proceeds to step s13 to judge whether the argument is void at the stage when the symbol has been inputted. When the argument is not judged to be void, the process proceeds to s11 to move the cursor from the input position of the argument to the normal display line 81. Furthermore, the process proceeds to step s12 to register the inputted element into the data storing RAM 35 and display on the display device 65. When the argument is void at the stage when the symbol has been inputted, the process proceeds to step s12 to register the inputted element as an argument into the data storing RAM and display on the display device 65.

When the inputted element is a left bracket at step s10, the process proceeds to step s13 to judge whether the argument is void at the stage when the left bracket has been inputted. When the argument is not void, the process proceeds to step all to move the cursor 82 from the input position of the argument to the normal display line 81. Furthermore, the process proceeds to step 12 to register the inputted element into the data storing RAM 35 and display on the display device 65. When the argument is void at the stage when the left bracket is inputted, the process proceeds to step s12 to register the inputted element as an argument in the data storing RAM 35 and display on the display device 65. The processings of steps s10, s13, s12 correspond to input operation E of FIG. 2.

Figure 4:
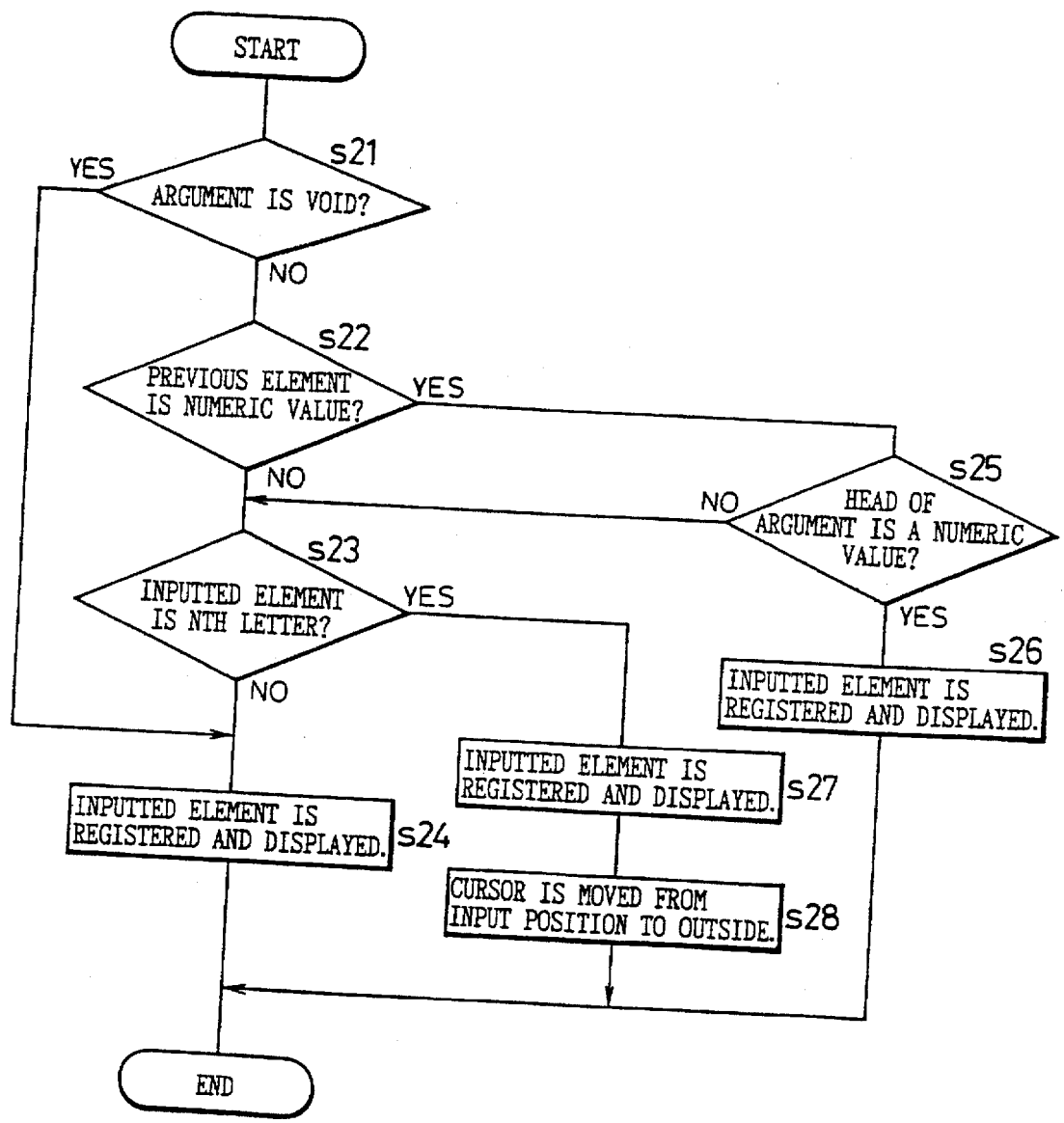
FIG. 4 is a flowchart for explaining numeric value registration processing.

FIG. 4 is a flowchart for explaining numeric value registration processing. When the judgment at step s7 in FIG. 3 is affirmative, namely when a numeric value is inputted in the case where the cursor 82 is placed at the input position of the argument and the head of the argument is not the left bracket, the flowchart of FIG. 4 is executed.

In the flowchart of FIG. 4, at the stage when a numeric value is inputted as an argument at step s21, it is judged whether the argument is void. When the argument is not void, the process proceeds to step s22 to judge whether the element immediately before the inputted element is a numeric value. When the element immediately before the inputted element is not a numeric value, the process proceeds to step s23 to judge whether the inputted element is the input of the N-th letter in the argument. When the number of the elements of the argument is still less than N letters even with the addition of the inputted element, the process proceeds to step s24 where the inputted element is registered as an argument in the data storing RAM 35 and display on the display device 65. When the argument is void at step s21, the process proceeds to step s24 where the inputted element is displayed as an argument in the data storing RAM and is displayed on the display device 65.

When it is judged at step s22 that the element immediately before the inputted element is a numeric value, the process proceeds to step s25 to judge whether the head of the argument being currently inputted is a numeric value. When the head of the argument is the numeric value, the process proceeds to step s28 where the inputted element is registered as an argument in the data storing RAM 35 and is displayed on the display device 65. When it is judged at step 25 that the head of the argument being currently inputted is not a numeric value, the process proceeds to step s23 to judge whether the inputted element is the input of the N-th letter in the argument. When the number of the elements in the argument is less than N letters even with the addition of the inputted element, the process proceeds to step s24 where the inputted element is registered in the data storing RAM 35 and is displayed on the display device 65.

When it is judged at step s23 that the inputted element is the N-th letter in the elements of the argument, the process proceeds to step s27 where the inputted element is registered as an argument in the data storing RAM 35 and is displayed on the display device 65. Additionally, the process proceeds to step s28 to move the cursor 82 from the input position of the argument to the normal display line 81.

Figure 5:
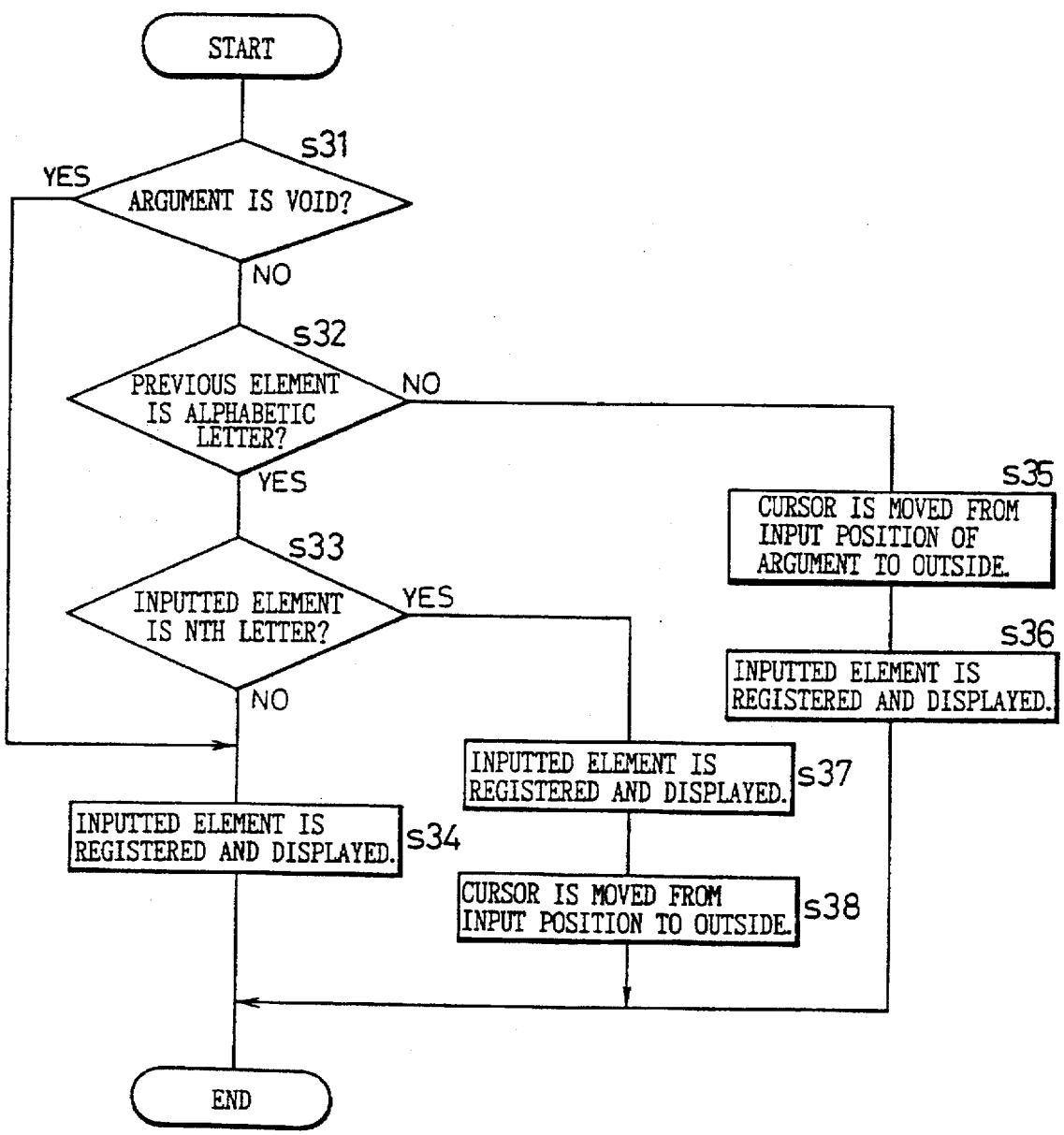
FIG. 5 is a flowchart explaining alphabetic letter registration processing.

FIG. 5 is a flowchart for explaining alphabetic letter registration processing. When the judgment at step s8 in FIG. 3 is affirmative, namely when the cursor 82 is located at the input position of the argument and an alphabetic letter is inputted without the left bracket at the head of the argument, the flowchart of FIG. 5 is executed.

In the flowchart of FIG. 5, it is judged whether the argument is void at step 31. When the argument is not void, the process proceeds to step s32 to judge whether the element immediately before the inputted element is an alphabetic letter. When the element immediately before the inputted element is an alphabetic letter, the process proceeds to step s33 to judge whether the incurred element is the input of the N-th letter in the argument 1. When the number of elements in the argument is less than N letters even with the addition of the inputted element, the process proceeds to step s34 where the inputted element is registered as an argument in the data storing RAM 35 and is displayed on the display device 65. When the argument is void at step 31, the process proceeds to step 34. Where the inputted element is registered as an argument in the data storing RAM 35 and is displayed in the display device 65.

When it is judged at step s32 that the element immediately before the element inputted is not an alphabetic letter, the process proceeds to Step s35 where the cursor 82 is moved from the input position of the argument to the normal display line 81. Further, at step s36, the inputted element is registered in the data storing RAM 35 and is displayed on the display device 65.

When it is judged that the inputted element is the N-th letter of the elements in the argument being currently inputted, the process proceeds to step s37 where the inputted element is registered as an argument in the data storing RAM 35 and is displayed on the display device 65. Further, the process proceeds to step s38 to move the cursor 82 from the input position of the argument to the normal display line 81.

As described above, according to the invention, when a single item expression is inputted as an argument, the apparatus automatically moves the cursor 82 from the input position of the argument to the normal display line 81 at the stage of the input of an element which is not recognized as an argument. Consequently, it is easy for users to recognize that the argument is being inputted.

Additionally, when an expression consisting of a plurality of items is inputted as an argument, the whole process is so constituted that the left bracket must be inputted at the head of the argument without fail. When the right bracket is inputted which pairs with the left bracket, the apparatus automatically moves the cursor 82 from the input position of the argument to the normal display line 81. Thus it is easy for users to recognize whether they can input the expression consisting of a plurality of items as an argument.

FIG. 6 is a view explaining an input example of a mathematical expression according to a second embodiment of the invention. In an input example shown in FIG. 8, the inputted elements and limitations on the elements are identical to those of the input example shown in FIG. 2. An explanation is given with respect to the characteristics of the embodiment. In addition, constituent elements in FIGS. 6A–6C identical with those in FIG. 2 are designated by identical reference numerals in FIG. 2. Input operations A, B, C of FIG. 8 are the same as input operations A, B, C of FIG. 2, respectively.

The embodiment is characterized in that the shape of the cursor 82 is changed at the time of the input of an argument. The normally displayed cursor 82 is displayed so that only the peripheral of a display area for one element is displayed black. Thus, a white square with a black outline is displayed. It is referred to as "white square" hereinafter. On the other hand, the cursor 87 having a different shape after the change of shape is referred to as "black square" hereinafter, because all the display area for the space of one element is displayed black, and looks like a black square.

In input operation A of FIG. 6, when the numeric value "2" key 41b included in the numeric value key 41 is inputted, the numeric value "2" is displayed on the predetermined display line 81. When the power calculation key 52 is inputted for designating the power calculation, the numeric value "2" constitutes a base of the power calculation. To urge the user to input an exponent which is an argument of the power calculation, the CPU 32 of the calculator 31 changes the cursor shape from the "white square" (cursor 82) to the "black square" (cursor 87) to move the cursor 87 to the exponent display part 83 set above the display line 81 and display the cursor 87 there.

In input operation B of FIG. 6, like FIG. 2B, when the alphabetic letter "A" is inputted, the letter "A" is displayed on the exponent display part 83. The cursor 87 is located at the right side of the alphabetic letter "A" of the exponent display part 83. In input operation C of FIG. 6, when the numeric value "1" key 41a included in the numeric value keys 41 is inputted, the CPU 32 displays the numeric value "1" to judge that the input of the argument has been ended because the second letter has been inputted. Then the CPU 32 changes the shape of the cursor from the "black square" (cursor 87) to the "white square" (cursor 82) to display the cursor 82 at the position following the element (power) which is already displayed on the normal display line 81.

Figure 7A:
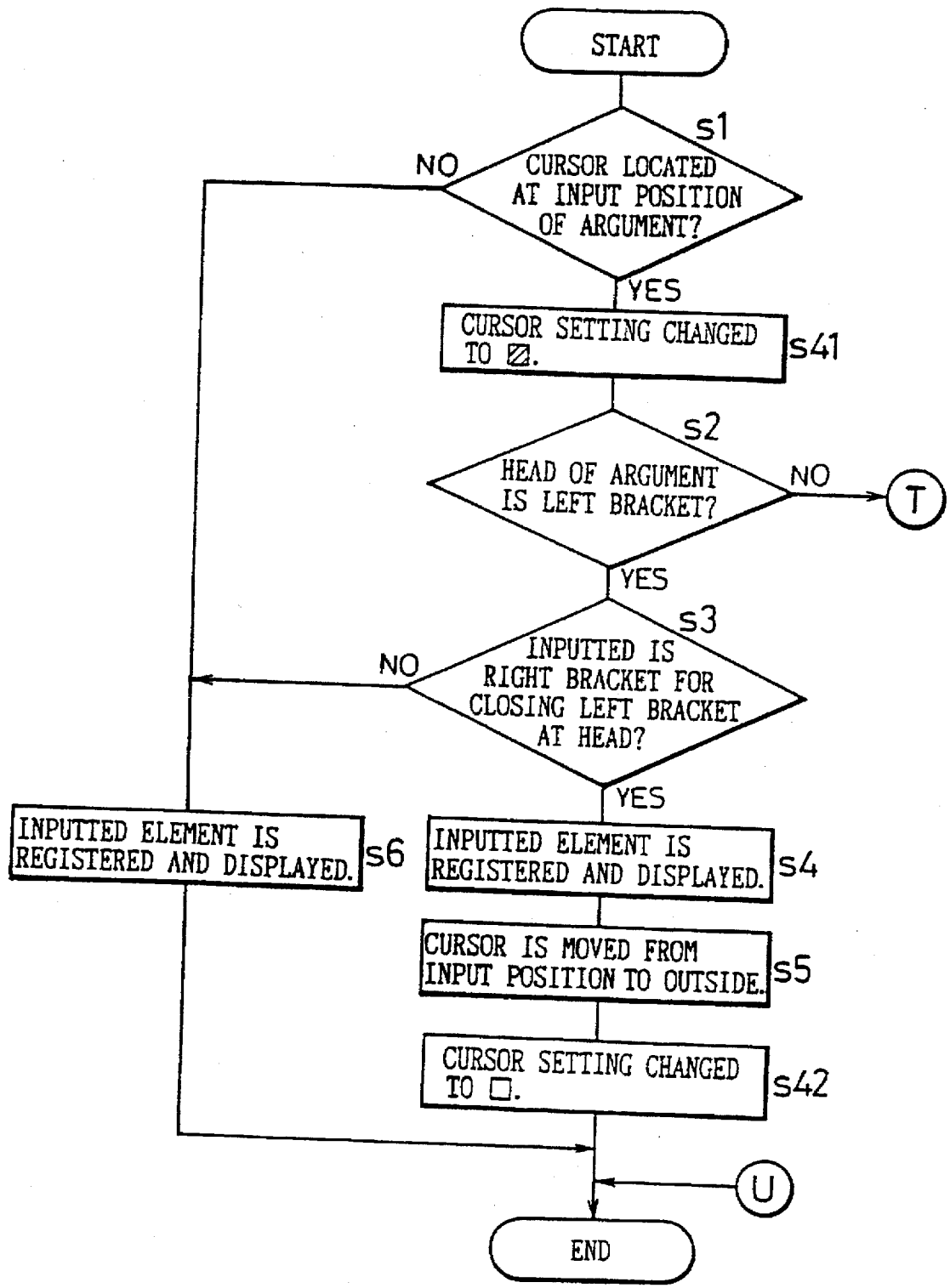
FIGS. 7A, 7B are a flowchart explaining mathematical expression input processing according to the second embodiment.
Figure 7B:
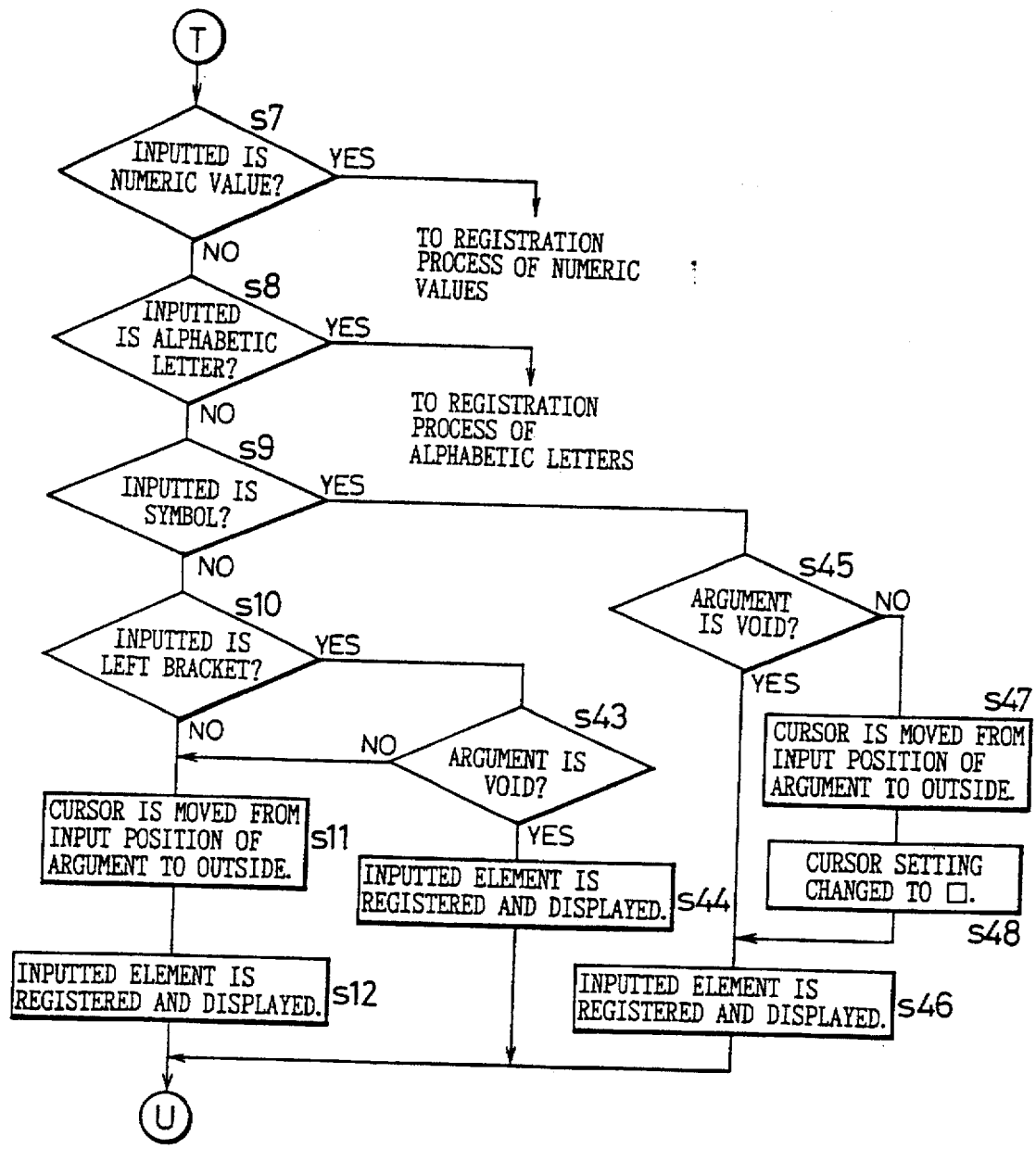

FIG. 7 is a flowchart for explaining mathematical expression input processing according to the second embodiment.

The flowchart shown in FIG. 7 shows the processing including the steps of the flowchart of FIG. 3. The process of FIG. 7 identical with those of FIG. 3 are designated by identical step numbers, and the detailed descriptions of the steps are omitted. The particular characteristics of the embodiment will be explained through the comparison with the flowchart of FIG. 3.

In this flowchart, the processing at step s41 is inserted between step s1 and step s2 so that the processing at step s42 is performed following the processing at step s5. Additionally, as a branching end of step s10, step s43 and step s44 are executed. Further, step s46, step s47 and step s48 are executed as a branching end of step s9.

At step s1, when the cursor 82 is located at the input position of the argument, the process proceeds to step s41. At step s41, the cursor shape changes from the "white square" (cursor 82) to the "black square" (cursor 87). After the change in the cursor shape, the processing after step s2 is executed.

At step s42 following step s5, the cursor shape changes from the cursor 87 to the cursor 82.

At step s10, when the input element is the left bracket, the process proceeds to step s43. At step s43, it is judged whether the argument is inputted before the input of the left bracket. When the argument is void, the process proceeds to step s41. At step 44, the left bracket which is an inputted element is registered in the data storing RAM 35, and is displayed on the display device 65. After the left bracket is displayed, the processing is ended. Additionally, at step s43, when the argument is not void, the processing after step s11 is performed.

At step s9, when the inputted element is a symbol, the process proceeds to step s45. At step s45, it is judged whether the argument is inputted before the symbol is inputted. When the argument is void, the process proceeds to step s46, where the symbol which is the inputted element is registered in the data storing RAM 35 and is displayed on the display device 65. After the symbol is displayed, on processing is ended.

At step s45, when the argument is not void, the process proceeds to step s47. At step s47, the cursor 89 is moved from the input position to the outside. At the following step s48, the cursor shape is changed from the cursor 87 to the cursor 82. After the change of the cursor shape, the processing after the step s48 is executed.

As described above, this embodiment has an advantage in that users dan easily recognize that the argument is being inputted because the cursor shape is changed at the input position of the argument in addition to the advantage obtained in the first embodiment. In addition, after the end of the input of the argument, the cursor moves from the input position of the argument to the normal display line and the cursor shape is brought back to the original shape with the result that the operation by users can be omitted.

FIG. 8 is a view for explaining a mathematical expression input example according to a third embodiment of the present invention. In an input example shown in FIG. 8, since the inputted elements and the limitations on the elements are substantially the same as those of the input example shown in FIG. 2, the particular characteristics of the embodiment will be explained. In addition, constituent elements of FIG. 8 identical with those of FIG. 2 are designated by the same reference numerals, and explanation thereof is omitted. Input operations A–G of FIG. 8 are the same as input operations A–G of FIG. 2.

The embodiment is characterized in that when the left bracket is inputted at the head of the input position of the argument at the time of the argument input, the cursor shape is changed from the white square (cursor 82) to the black cursor (cursor 87).

Input operations A–D of FIG. 8 are the same as input operations A–D of FIG. 2, respectively, and the displayed results corresponding to the respective operations A–D of FIG. 8 are also the same as those of FIG. 2. In input operation E of FIG. 8, since the left bracket is inputted at the head of the input position of the argument in the root symbol, the cursor shape which is the "white square" (cursor 82) up to FIG. 8D is changed to the "black square" (cursor 87). The mathematical expression "3+4" to be inputted of input operation F of FIG. 8 is displayed at the input position of the argument in the root symbol and the cursor 87 is also displayed adjacent to the right side thereof. In input operation F of FIG. 8, since the argument is being inputted, the cursor shape is not changed and the black square (cursor 87) is retained.

In input operation G of FIG. 8, when the right bracket is inputted which closes the left bracket located at the head of the input position of the argument, the input of the argument is ended. The upper horizontal linear portion 85 has a length sufficient to include the mathematical expression "3+4" in the root symbol, and the cursor 87 is moved from the input position of the argument to the normal display line 81. Since the input of the argument is ended, the cursor shape is changed from the "black square" (cursor 87) to the "white square" (cursor 82).

Figure 9A:
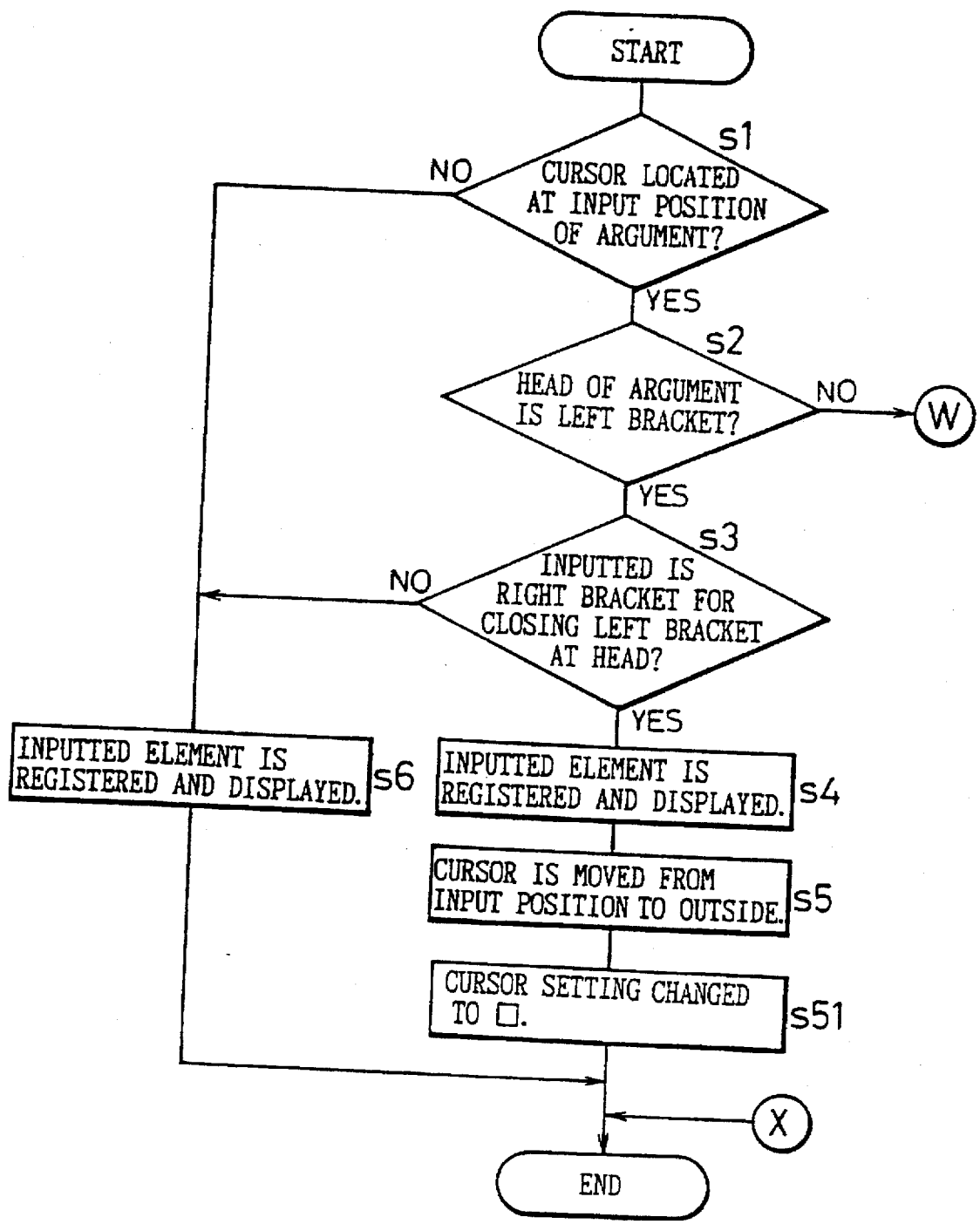
FIGS. 9A, 9B are a flowchart for explaining mathematical expression input processing according to the third embodiment of the invention.
Figure 9B:
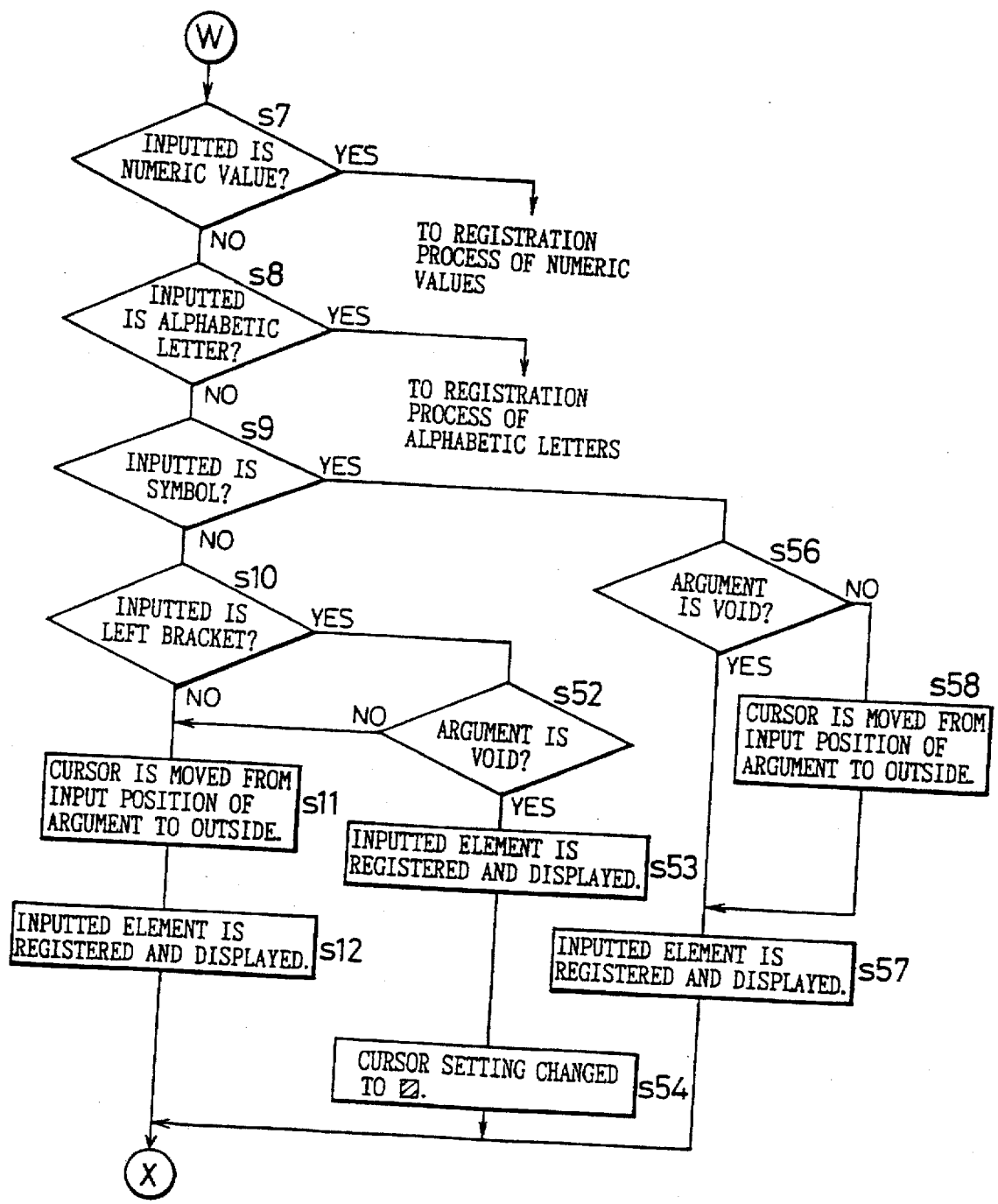

FIG. 9 is a flowchart for explaining mathematical expression input processing according to the third embodiment. The flowchart shown in FIG. 9 is described including the processes flowchart of FIG. 3. The processes of FIG. 9 identical with those of FIG. 3 are designated by identical step numbers. The explanations thereof are omitted. The particular characteristics of the embodiment will be explained through the comparison with the flowchart of FIG. 3.

In the flowchart shown in FIG. 9, when both judgments at steps s1 and s2 are affirmative, namely the cursor is located at the input position of the argument and the head element is the left bracket, the cursor shape in the embodiment is the "black square". When the judgment at step s3 is affirmative, namely the inputted element is the right bracket which closes the left bracket at the head, in the case of FIG. 3 the element (right bracket) inputted at step s4 is registered on the data storing RAM 35, and is displayed in the display device 85. At step s5 in FIG. 3, the cursor 82 is moved from the input position of the argument to the normal display line 81. In the case of the flowchart of FIG. 9, there is provided as step s51 following the step s5 the processing in which the cursor shape setting is changed from the "black square" (cursor 87) to "white square" (cursor 82). The processings of step s1–s5, s51 correspond to input operation G of FIG. 8.

At step s9, when it is judged that the inputted element is a symbol, the process proceeds to step s56 to judge whether the argument is void or not. When the argument is void, the process proceeds to step s57 where the inputted element is stored in the data storing RAM 35 and is displayed on the display device 85. When the argument is not void, the process proceeds to step s58 to move the cursor 82 from the input position of the argument to the normal display line 81 followed by registering the input element in the data storing RAM 35 and displaying the element in the display device 65 as step s57.

When it is judged at step s10 that the inputted element is the left bracket, the process proceeds to step s52 to judge whether the argument is void or not. When the argument is void at the stage of the input of the left bracket, the process proceeds to step s53 where the inputted element is registered in the data storing RAM 35 and is displayed on the display device 65. In the flowchart shown in FIG. 3, the left bracket is only registered in the data storing RAM 35 and is only displayed in the display device 65. In the flowchart shown in FIG. 9 there is further provided as step s54 a processing in which the cursor shape setting is changed from the "white square" (cursor 82) to the "black square" (cursor 87). The processings of steps s10, s52–s54 correspond to input operation E of FIG. 8.

As described above, in accordance with the embodiment, the cursor shape is changed by inputting the left bracket at the input position of the argument, in addition to the effect obtained in the first embodiment, users can easily recognize that a mathematical expression consisting of plural items can be inputted in the argument. In addition, the cursor moves from the input position of the argument to the normal display line by closing the expression with the right bracket corresponding to the left bracket with the result that the cursor shape returns to the original shape and operational troubles caused by users can be saved.

FIGS. 10A–10G are views for explaining an input example of a mathematical expression according to a fourth embodiment of the invention. In the input example of FIGS. 10A–10G, the input elements and limitations on the elements are the same as those of the input example shown in FIG. 6. The particular characteristics of the invention will be explained. Identical constituents are designated by identical reference numerals. Explanations thereof are omitted. Input operations A–G of FIG. 10 are the same as input operations A–G of FIG. 2, respectively.

The characteristics of the invention is that the bracket symbol inputted only for the input of a mathematical expression as an argument is eliminated at the end of the input of the argument.

As described above, input operations A–D of FIG. 10 are the same as input operations A–D of FIG. 2, and the display results corresponding to input operations A–D of FIG. 10 are also the same as those of FIG. 2. In input operation E of FIG. 10, when the left bracket is inputted at the head of the input position of the argument, the cursor shape is changed so that the mathematical expression "3+4" is inputted as the argument in input operation F of FIG. 10. Up to this stage, the process is the same as that up to stage shown in input operation F of FIG. 8.

In input operation G of FIG. 10, when the right bracket is inputted which closes the left bracket located at the head of the argument, it is judged that the input of the argument is ended to eliminate the head left bracket and the right bracket which constitutes a pair with the left bracket. The length of the upper horizontal linear portion 85 of the root symbol 84 is changed so that the remaining "3+4" becomes an argument in the root symbol. In addition, the cursor shape which has moved from the input position of the argument to the normal display line 81 is changed from the "black square" (cursor 87) to the "white square" (cursor 82).

Figure 11A:
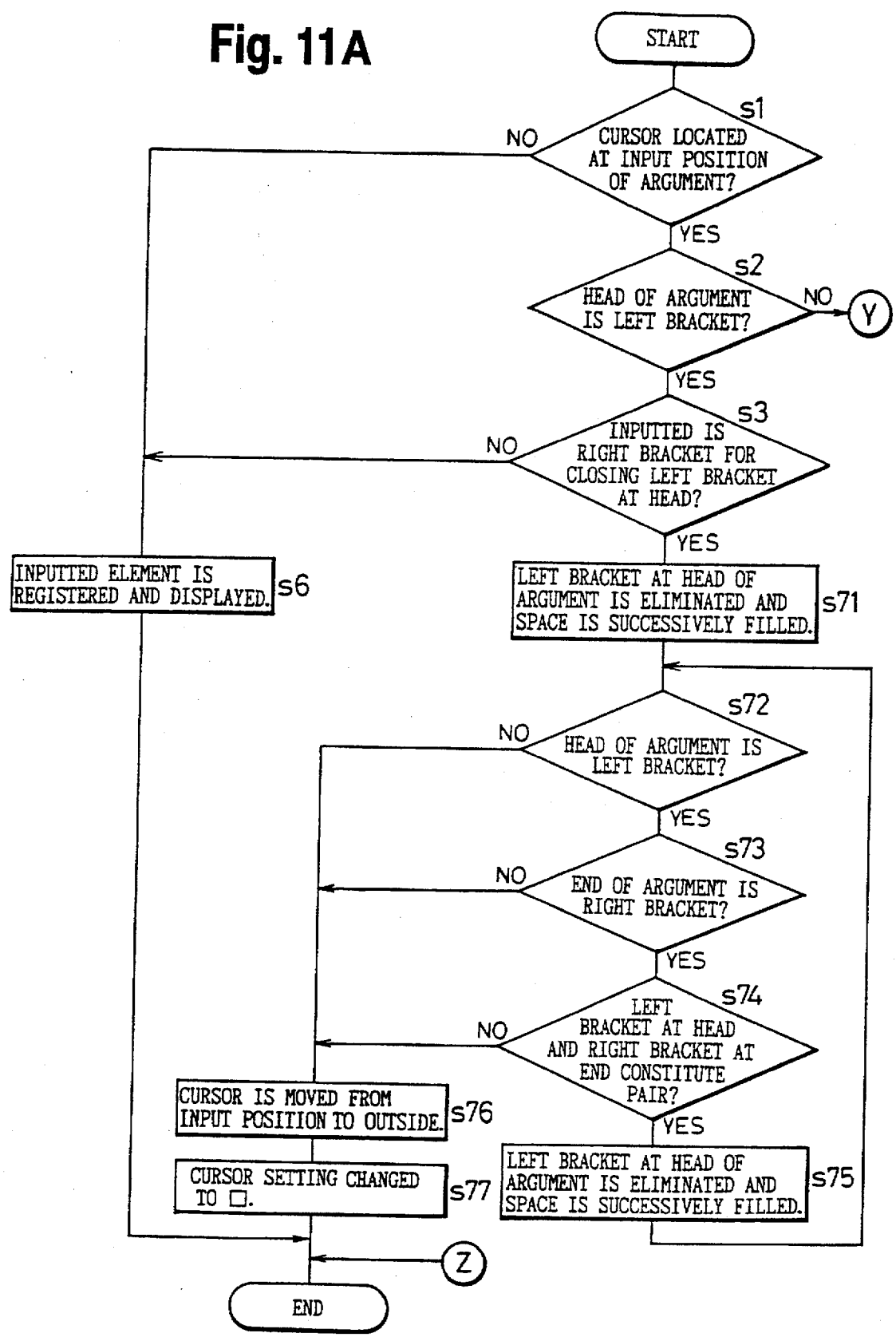
FIGS. 11A, 11B are a flowchart for explaining mathematical expression input processing according to the fourth embodiment of the invention.
Figure 11B:
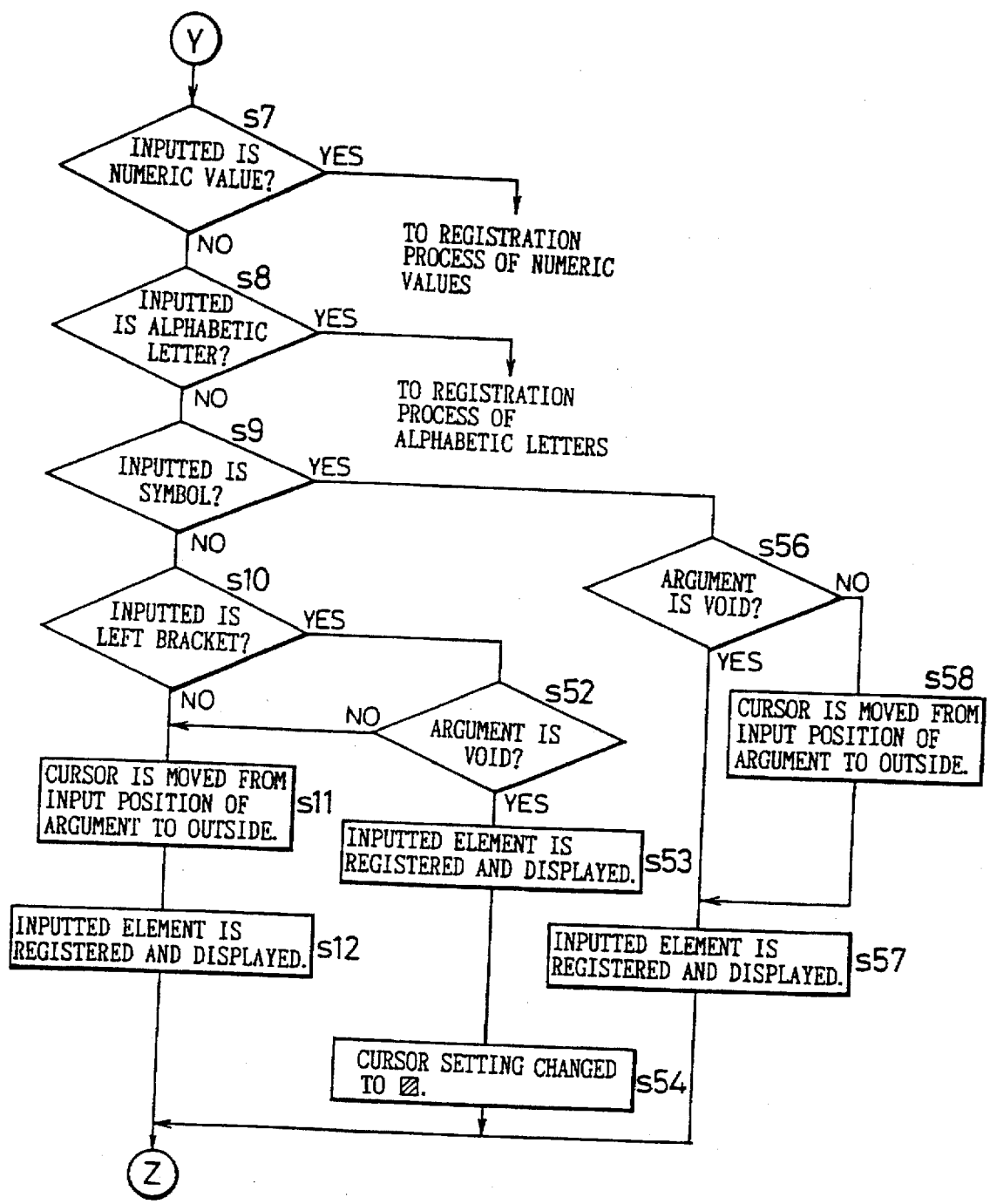
Figure 14:
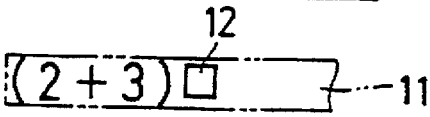
FIG. 14 is a view showing an input example of a fractional calculation expression in the conventional calculator.
Figure 14:
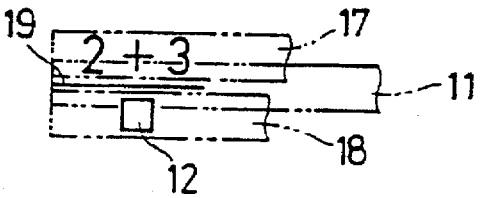
Figure 14:
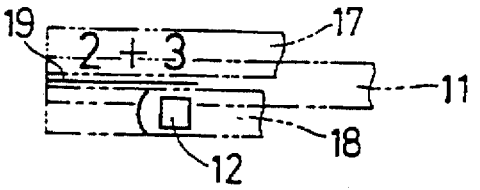
Figure 14:
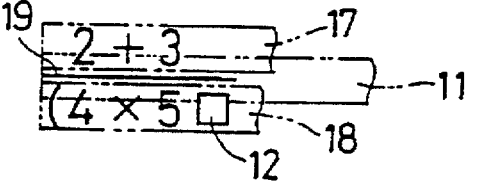
Figure 14:
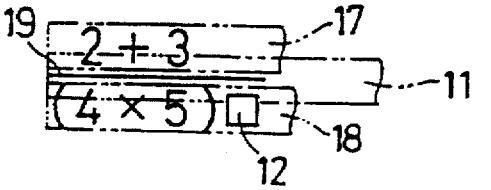
Figure 14:
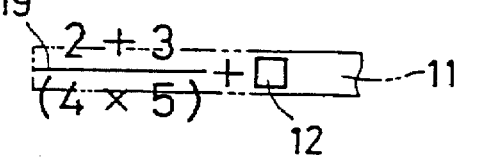
Figure 15:
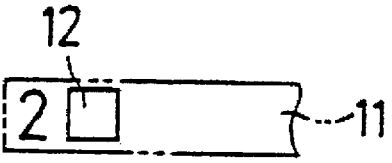
FIG. 15 is a view showing a power calculation expression in another conventional calculator.
Figure 15:
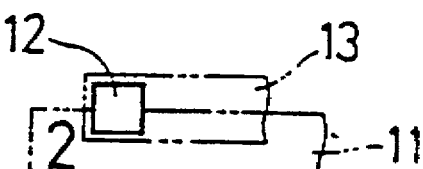
Figure 15:
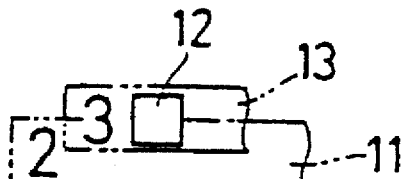
Figure 15:
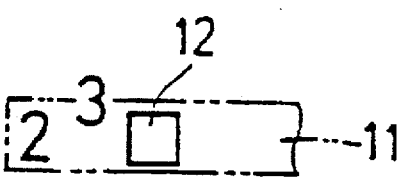
Figure 15:
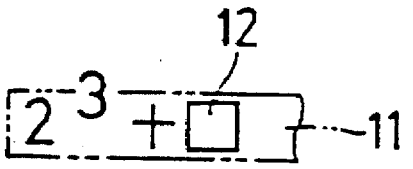
Figure 16:
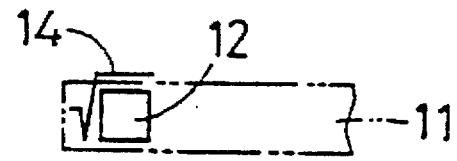
FIG. 16 is a view showing an input example of a root symbol calculation expression in another conventional calculator.
Figure 16:
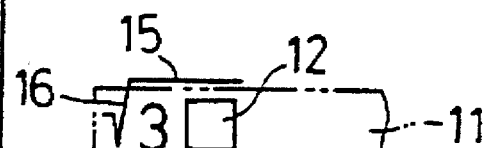
Figure 16:
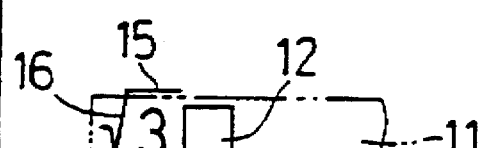
Figure 16:

FIG. 11 is a flowchart for explaining mathematical expression input processing according to the fourth embodiment. The flowchart shown in FIG. 11 is described including the processing in the flowchart of FIG. 9. Treatments of FIG. 11 identical with those of FIG. 9 are designated by identical step numbers. Explanations thereof are omitted. The particular characteristics of the embodiment will be explained.

In the flowchart of FIG. 11, the judgment at step s3 is affirmative, namely the right bracket is inputted which closes the left bracket located at the head of the input position of the argument, and then the process proceeds to step s71. The input right bracket is not registered in the data storing RAM 35 and is not displayed. In the flowchart shown in FIG. 9, when the judgment is affirmative similarly, the right bracket is registered in the data storing RAM 35 and is displayed in the display device 65 to move the cursor from the input position of the argument to the normal display line 81. Then the cursor shape is changed from the "black square" (cursor 87) to the "white square" (cursor 82).

At step s71 shown in the flowchart of FIG. 11, the left bracket located at the head of the argument is eliminated. Then in an empty .space in the memory area, elements that remain as an argument are filled in order. After that, the process proceeds to step s72 to judge whether the head of the elements that remain as an argument is the left bracket. When the end of the argument is the right bracket, the process proceeds to step s74 to judge whether the left bracket at the head and the right bracket at the end constitute a pair. When the two brackets constitute a pair, the process proceeds to step s75. Both brackets are eliminated and elements that remain as an argument are filled in the empty space in the memory area. When filling of the remaining elements is ended, the processings from step s72 are repeated again.

When the respective judgments at step s72, step s73, and step s74 are negative, the process proceeds to step s76 to move the cursor from the input position of the argument to the normal display line. Then the cursor setting is changed from the "black square" (cursor 87) to the "white square" (cursor 82).

As described above, in accordance with the embodiment, the bracket used only for the input of expressions comprising a plurality of items as arguments is automatically eliminated after the input of arguments in addition to the effects obtained in embodiment 1 and embodiment 2. Thus in the storage of the element of the mathematical expression, no surplus memory is consumed. Furthermore, since the processing is continued until the brackets which closes each other disappear, all the surplus brackets are eliminated and the usage amount of the memory can be further suppressed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A mathematical expression input apparatus comprising:

display means for displaying mathematical expressions;

input means for inputting mathematical expressions and elements constituting mathematical expression arguments;

selection means for selecting one of a plurality of mathematical functional expressions requiring a subsequent entry of one or more elements constituting an argument for the selected functional expression; and display control means for displaying an inputted element along a predetermined display line on the display means, the display control means further displaying a cursor having a predetermined shape, the position of cursor indicating a subsequent input position above, on or below the predetermined line of the display means; wherein the display control means automatically positions the cursor at an input position of a predetermined element corresponding to the selected functional expression; above, below or on the predetermined display line and repositions the cursor to a next sequential input position on the predetermined display line when it is determined on the basis of the inputted elements alone that the complete argument of the functional expression has been input.

2. The apparatus of claim 1, wherein the display control means determines that the input of the functional expression has been ended at the time of the input of an element other than numbers when a number is first inputted as an element included in a selected functional expression.

3. The apparatus of claim 1, wherein the display control means determines that the input of the functional expression has been ended at the time of the input of elements having a predetermined number of digits when a character representative of a variable is first inputted as an element which constitutes a selected functional expression.

4. The apparatus of claim 1, wherein, when a left bracket has been first inputted as an element included in a selected functional expression, the display control means determines the input of the functional expression has been ended at the time of the input of a right bracket which constitutes a pair of brackets with the left bracket and the control erases the pair of brackets at the time of the input of the right bracket.

5. The apparatus of claim 1, wherein the display control means displays the cursor in a shape different from the predetermined shape when the cursor is displayed in a predetermined element input position for a selected functional expression to indicate that an argument for the selected functional expression is required to be input by the user.

6. The apparatus of claim 4, wherein, when the left bracket is inputted as an element included in a selected functional expression, the display control means displays the cursor in a shape different from the predetermined shape.

7. The apparatus of claim 4, wherein, in the case where the left bracket has been inputted as an element included in a denominator of a fractional functional expression, the display control means erases the pair of brackets consisting of the left and right brackets at the time of the input of the right bracket.

8. The apparatus of claim 4, wherein the left bracket which is inputted as an element included in a functional expression has been erased, the display control means displays a next succeeding element shifted to the position occupied by the left bracket prior to erasure.

9. The apparatus of claim 1 wherein the selected functional expression is a radical expression.

10. The apparatus of claim 1 wherein the selected functional expression is a power expression.

11. The apparatus of claim 1 wherein the selected functional expression is a fractional expression.

* * * * *